United States Patent [19]

Frederiksen et al.

[11] Patent Number: 5,274,526
[45] Date of Patent: Dec. 28, 1993

[54] FUSE STRUCTURE

[75] Inventors: Bjarne Frederiksen, Villa Park; John F. Landuyt, Prospect Heights; E. Grant Swick, Bartlett, all of Ill.

[73] Assignee: Illinois Tool Works Inc., Glenview, Ill.

[21] Appl. No.: 737,676

[22] Filed: Jul. 30, 1991

[51] Int. Cl.⁵ .................... H02H 3/04; H02H 3/08
[52] U.S. Cl. ........................... 361/106; 361/103
[58] Field of Search .................. 361/103, 104, 106; 174/52.1, 92; 200/303; 337/87

[56] References Cited

U.S. PATENT DOCUMENTS

| | | | |
|---|---|---|---|
| 4,193,053 | 3/1980 | Biller et al. | 337/275 |
| 5,072,327 | 12/1991 | Knollman et al. | 361/106 |

*Primary Examiner*—Howard L. Williams
*Assistant Examiner*—Ronald W. Leja
*Attorney, Agent, or Firm*—Trexler, Bushnell, Giangiorgi & Blackstone

[57] ABSTRACT

A fuse structure for automatically resetting fuses is in the form of a housing for enclosing a resettable fuse circuit pack. The housing comprises a plurality of identically constructed shells. A plurality of ferrule mounts is disposed on the housing, and annular indentations are disposed on the ferrule mounts. Locking surfaces are located on the shells, and ferrules are placed on the ferrule mounts. A positive stop portion is positioned on the shells, and is associated with each ferrule mount for locating the ferrules on the ferrule mounts. New fuse circuits are also provided for insertion into the fuse structure.

22 Claims, 3 Drawing Sheets

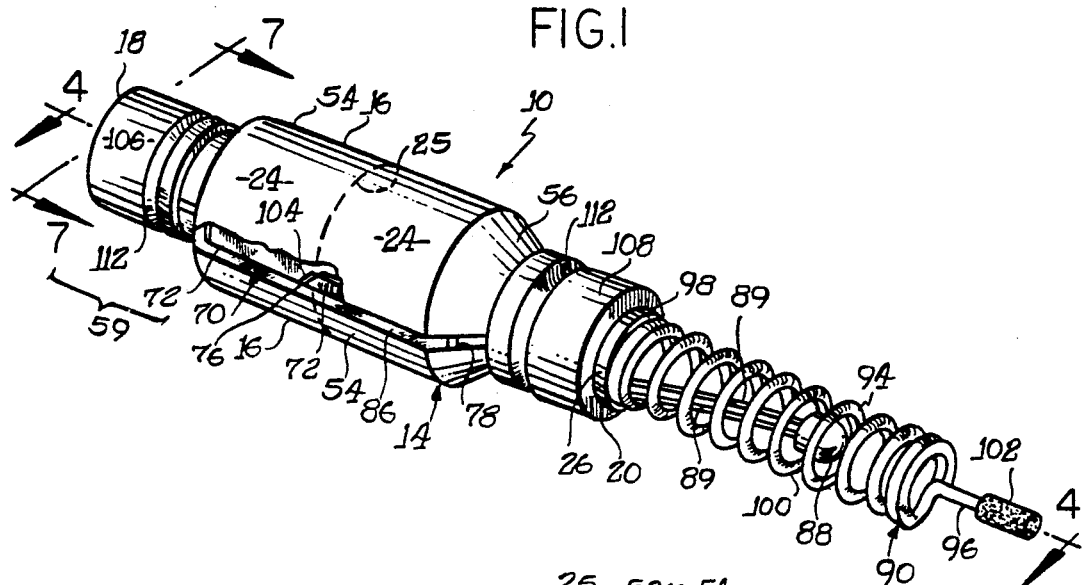
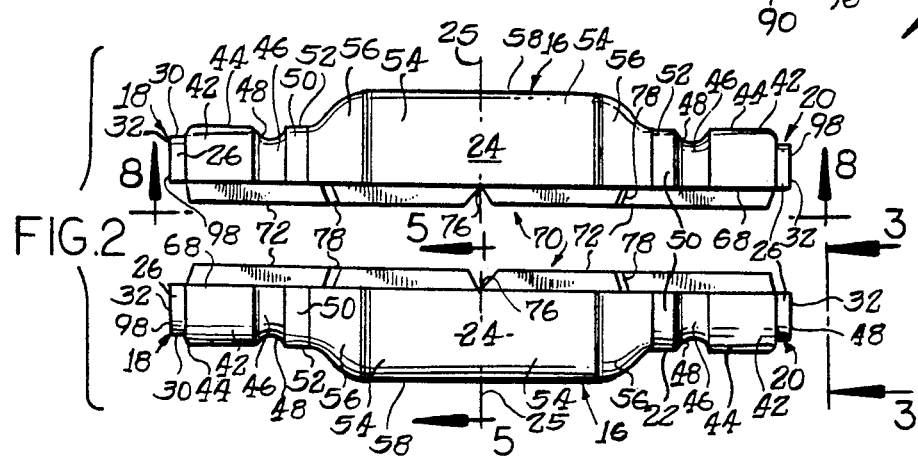
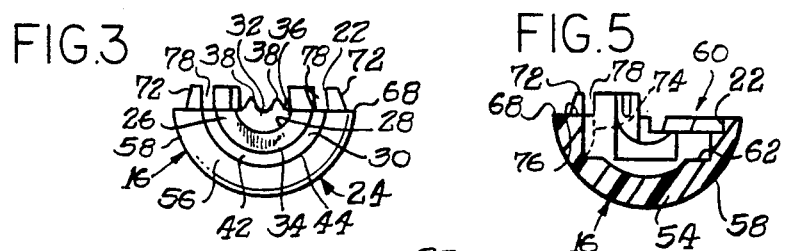
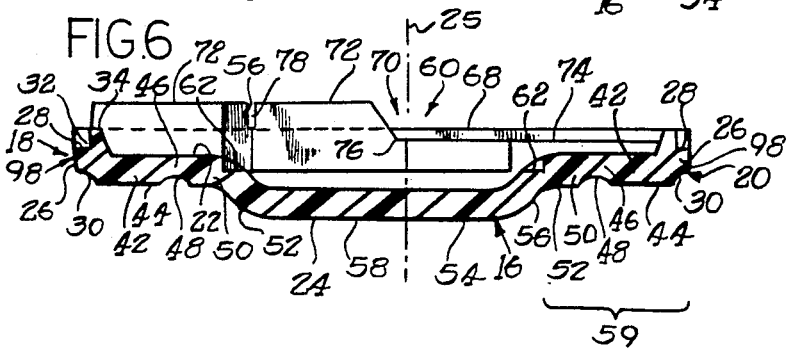

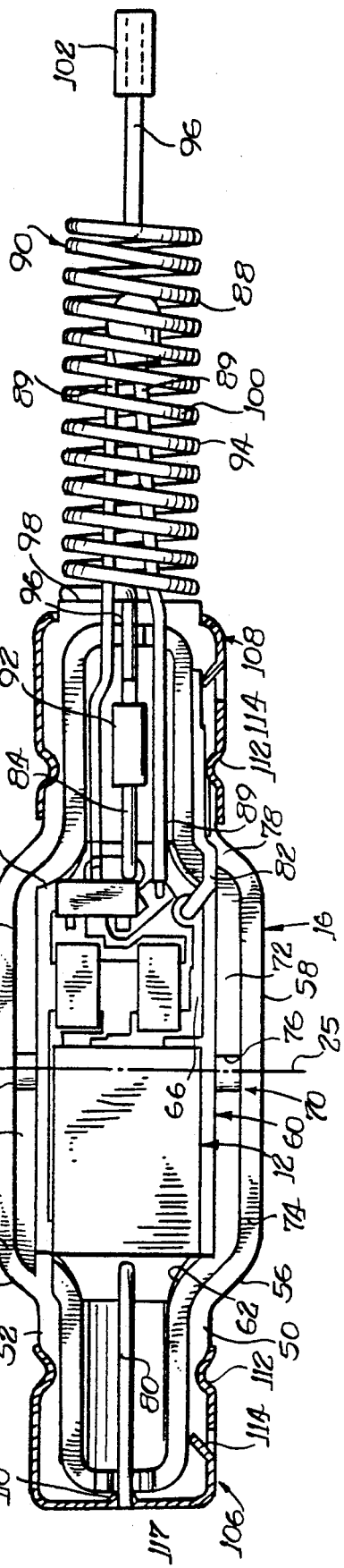
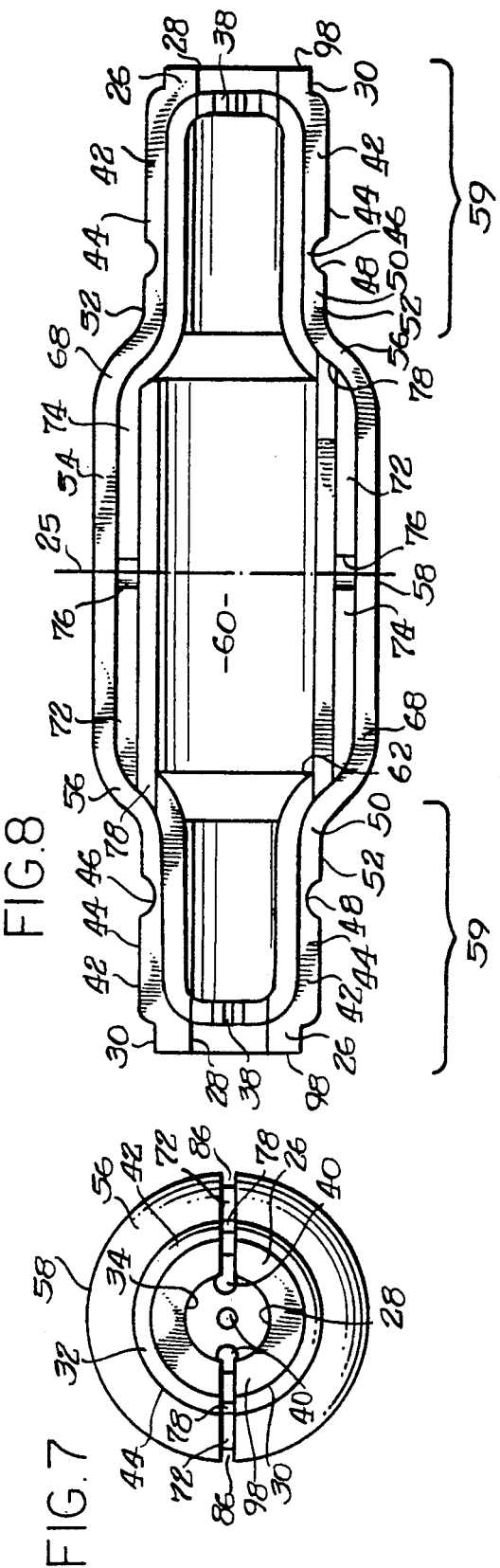

5,274,526

FUSE STRUCTURE

BACKGROUND AND SUMMARY OF THE INVENTION

The present invention generally relates to a new and unique construction and configuration for a structure for encompassing a automatically resetting indicator fuse. More specifically, the invention relates to a fuse structure for enclosing the fuse circuit pack disclosed in the co-pending application of Knollman et al., Ser. No. 07/469,646. Additionally, new and improved fuse circuits are provided.

The construction of indicator or automatically resetting fuses is well known in the relevant art. Such fuses are usually enclosed in a cylindrical, cartridge-type housing. The housing is usually composed of a strong paper product rolled into a cylinder. The rolling process is time consuming, and can be quite tedious.

A first electrical contact and a second electrical contact are disposed on opposite ends of the housing, and are preferably crimped to the housing in order to prevent their motion independent of the housing. The electrical contacts are electrically connected to a fuse circuit by a plurality of wires. However, the housing provides no guides for these wires, and accordingly, the wires may become damaged during the fuse assembly process.

The second electrical contact is connected to an electrically conducting spring Thus, the spring becomes a mere electrical extension of the second electrical contact. An end of the electrically conducting spring opposite to the end thereof connected to the second electrical contact terminates at a third electrical contact which is engagable with an alarm element.

Additionally, a fusible element extends axially within the spring from the second electrical contact to the third electrical contact. If the electrically conducting spring is stretched too far, the fusible element will rupture, thereby rendering the fuse inoperative. Thus, there are many drawbacks to using the indicator fuses of the prior art. The present invention is directed towards removing those drawbacks, and providing an improved fuse structure construction.

OBJECTS AND SUMMARY OF THE INVENTION

A general object of the present invention is to provide a new and unique structure for encompassing a automatically resetting indicator fuse.

A more specific object of the invention is to provide a fuse structure for housing the fuse circuit pack disclosed in the co-pending application of Knollman et al., Ser. No. 07/469,646.

Another object of the present invention is to provide a fuse structure that retrofits disposable 70-type fuses in open air fuse contacts or 18A fuse holders.

An additional object of the invention is to provide a fuse structure having a housing composed of identical half shell portions allowing for non-handed assembly thereof.

A further object of the present invention is to provide a fuse structure having interlocking means on the identical half shell portions of the fuse housing.

Another object of the invention is to provide a fuse structure having interlocking walls and troughs on identical half shell portions of the fuse housing.

An additional object of the present invention is to provide a fuse structure having positive stop locations for ferrules.

A further object of the invention is to provide a fuse structure having a housing possessing openings therein which allow electrical contacts to communicate from the interior of the fuse housing to the exterior thereof.

Another object of the present invention is to provide a fuse structure having cooling or venting means.

An additional object of the invention is to provide a fuse structure having a housing possessing vent openings therein.

A further object of the present invention is to provide a fuse structure having annular indentations which allow the ferrules to be crimped to the fuse housing.

Another object of the invention is to provide a fuse structure held together by crimping of the ferrules.

An additional object of the present invention is to provide a fuse structure having a longitudinal reveal line disposed on the fuse housing for accepting electrical contacts.

A further object of the invention is to provide a fuse structure wherein the ferrules have a crimp for preventing rotation thereof about the fuse housing.

Another object of the present invention is to provide a fuse structure having an electrically conducting spring for contacting an alarm.

An additional object of the invention is to provide a fuse structure having an insulated spring pad disposed on the housing.

A further object of the invention is to provide a fuse structure having an electrically conducting spring having similarly constructed pig-tail ends.

Another object of the invention is to provide a fuse structure having an electrically conducting spring having equal length ends to allow for non-handed assembly thereof.

An additional object of the present invention is to provide a fuse structure having a splice which connects the electrically conducting spring to the circuit pack.

A further object of the invention is to provide a fuse structure having a splice which helps to avoid the application of undue torsional force to the circuit pack.

Another object of the present invention is to provide a fuse structure having an electrically conducting spring capable of accepting an indicator device.

An additional object of the invention is to provide a fuse structure having a light-emitting diode disposed within a coiled, electrically conducting spring.

A further object of the invention is to provide a fuse structure having supporting means for supporting a circuit pack contained within the structure.

Another object of the invention is to provide a fuse structure having a circuit pack mount of a configuration which conforms to the peripheral configuration of a printed circuit board of the circuit pack.

An additional object of the invention is to provide a fuse structure having positive stop means capable of properly positioning the locking means.

A further object of the invention is to provide new and useful fuse circuits.

A fuse structure for automatically resetting fuses, constructed according to the teachings of the present invention, containing a circuit pack comprises a housing for enclosing a resettable fuse circuit pack. The housing comprises a plurality of identically constructed shells. A plurality of ferrule mounts is disposed on the housing, and annular indentations are disposed on the ferrule mounts. Locking means is located on the shells, and ferrules are placed on the ferrule mounts. A positive stop portion is positioned on the shells, and is associated with each ferrule mount for locating the ferrules on the ferrule mounts.

BRIEF DESCRIPTION OF THE DRAWINGS

The organization and manner of the structure and operation of the invention, together with further objects and advantages thereof, may best be understood by reference to the following description taken in connection with the accompanying drawings, wherein like reference numerals identify like elements in which:

FIG. 1 is a perspective view illustrating a fuse structure, constructed according to the teachings of the present invention, showing the unique construction and external configuration thereof;

FIG. 2 is exploded view of the housing of the fuse structure of FIG. 1, with the circuit pack not shown for clarity, showing the interlocking means on both shells of the housing;

FIG. 3 is an end elevational view, taken along line 3—3 of FIG. 2, of one shell;

FIG. 4 is a sectional view, taken along line 4—4 of FIG. 1, showing the construction of the fuse structure;

FIG. 5 is a sectional view taken along line 5—5 of FIG. 2;

FIG. 6 is a longitudinal sectional view of one of the shells;

FIG. 7 is an end elevational view of the fuse structure body taken along line 7—7 of FIG. 1 with the ferrule removed;

FIG. 8 is a view, taken along line 8—8 of FIG. 2, showing the construction of the interior side of a shell comprising the housing of the fuse structure;

DETAILED DESCRIPTION OF THE PREFERRED EMBODIMENT

Figure 9:
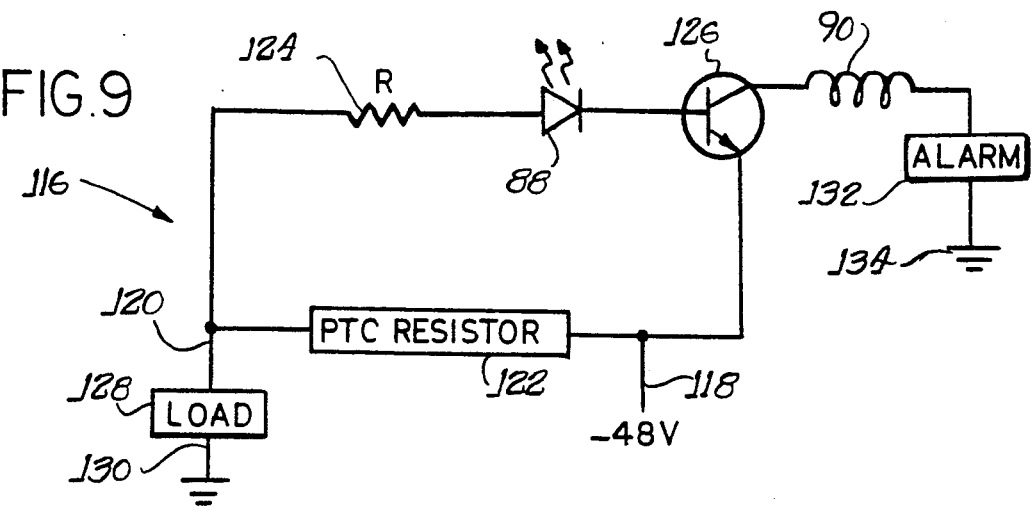
FIG. 9 is a schematic diagram of a new and useful fuse circuit having only one resistor.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

Referring initially to FIG. 1 and 4, a fuse structure 10, constructed according to the teachings of the present invention, containing a fuse in the form of a new and novel fuse circuit pack 12 (as shown in FIG. 4) is illustrated. The fuse structure 10 is particularly adapted to encompass the circuit pack 12, shown in FIG. 4, although the fuse structure 10 can be employed with other, differently configured fuses or fuse circuits, as those disclosed herein. The fuse circuit pack 12 is the subject matter of the co-pending U.S. patent application of Knollman, Ser. No. 07/469,646, and the contents of that patent application are incorporated herein by this reference.

The fuse structure 10 generally comprises a housing 14 comprised of two identical half body portions or shells 16. The shells 16 are preferably composed of a plastic material, thereby allowing them to be molded, and thereby mass-produced cheaply. Because the half shells 16 are identical in construction, the shells 16 may be assembled to form the housing 14 in a non-handed fashion, as shown in FIG. 2. In other words, any two shells 16 may be assembled to form the housing 14.

Because the shells 16 are identical, their construction will be discussed in relation to only one thereof. Each shell 16 has a first end 18 and a second end 20, and an interior side 22 and an exterior side 24. The construction of each shell 16 is mirrored about a latitudinal midline 25 thereof, as illustrated in FIG. 2 Each shell 16 has a substantially semi-circular latitudinal cross section, as shown in FIG. 3 and FIG. 5, so that when assembled, the housing 14 takes on a substantially cylindrical external form.

The configuration of the exterior side 24 is shown clearly in FIG. 2. The shell 16 has a first portion 26 disposed on the first end 18. The first portion 26 is substantially half-ring shaped, having an inner diameter 28 and an outer diameter 30. The first portion 26 is the space between the inner diameter 28 and the outer diameter 30.

However, a jagged portion 32 is disposed within the inner diameter 28, as shown in FIG. 3. The jagged portion 32 is set back within the inner diameter 28 a certain distance from the first end 18. The jagged portion 32 is semi-circular in nature, having and arcuate portion 34 and a depending substantially linear portion 36. The arcuate portion 34 is connected to the first portion 26 along the entirety of the inner diameter 28. The linear portion 36 has scallops 38 thereon which depend from the linear portion 36, and project upwardly into the jagged portion 32. The scallops 38 form a plurality of wire apertures 40 when two shells 16 are joined, as will be discussed herein.

The shell 16 has a second portion 42 disposed adjacent to the first portion 26, with one edge of the second portion being defined by the first portion 26. Thus, the first portion 26 is disposed on the exterior side 24 of the shell 16 between the second portion 42 and the first end 18. The second portion 42 is substantially semi-circular in shape, and has a diameter 44 substantially larger than the outer diameter 30 of the first portion 26. The second portion 42 is substantially smooth and free of burrs so as to facilitate placement of the ferrules, as will be discussed herein.

The shell 16 has a third portion 46 disposed adjacent to the second portion 42, with one edge of the third portion 46 being defined by the second portion 42. The third portion 46 is also substantially semi-circular in shape, and has a diameter 48 substantially reduced with respect to the diameter 44 of the second portion 42. The margin between the second and third portions 42 and 46, respectively, is sloped so as to form a smooth transition from the diameter 44 on the second portion 42 to the diameter 48 of the third portion 46. The decreased magnitude of the diameter 48 of the third portion 46 allows it to function as annular indentation or crimp receiving area for firmly retaining a crimp on the ferrules, as will be discussed herein.

A fourth portion 50 is disposed on the shell 16 adjacent to the third portion 46. One edge of the fourth portion 50 is defined by the third portion 46. The fourth portion 50 has a diameter 52 substantially equal to the diameter 44 on the second portion 42. The configuration of the fourth portion 50 is substantially similar to the corresponding configuration of the second portion 42, however, the fourth portion 50 occupies a length along the shell 16 smaller than a corresponding length occupied by the second portion 42.

A fifth portion 54 is disposed on the shell 16 adjacent to the fourth portion 50. The fifth portion 54 is joined to the fourth portion 50 by a sloping portion 56. The sloping portion 56 provides a smooth transition between the fourth and fifth portions 50 and 54, respectively.

The fifth portion 54 extends from the sloping portion 56 to the latitudinal midline 25 of the shell 16. Thus, from the latitudinal midline 25 to the first end 18, in this order, the fifth portion 54, the sloping portion 56, the fourth portion 50, the third portion 46, the second portion 42, and the first portion 26 are disposed on the shell 16, as shown in FIG. 2. The first, second, third, and fourth portions 26, 42, 46, and 50, respectively, form a ferrule mount 59 on the housing 14. The construction and configuration of the shell 16 as described above is mirrored about the latitudinal midline 25 so that the same order of portions is disposed on the shell 16 from the midline 25 to the second end 20. This construction of the shell 16 allows for the non-handed assembly of the housing 14 of the fuse structure 10.

With the construction of the exterior side 24 of the shell 16 completely disclosed, reference is made to FIG. 8 to disclose the construction of the interior side 22 of the shell 16. The thickness of the shell 16 is substantially the same in all areas. Accordingly, the diameters of the portions create a recess 60 on the interior side 22 of the shell 16. The recess 60 is of sufficient dimensions to accept the fuse circuit pack 12.

Moreover, supporting means in the form of a circuit pack mount 62, specifically configured to accept, to retain, and to support the circuit pack 12 is disposed within the recess 60 from the juncture between the fourth portion 50 and the sloping portion 56 proximate the first end 18 to a corresponding juncture proximate the second end 20. The configuration of the circuit pack mount 62 conforms to a peripheral configuration 64 of the printed circuit board 66 of the circuit pack 12, as shown in FIG. 4. The presence of the circuit pack mount 62 is a significant improvement over the prior art.

The shell 16 has a substantially smooth bottom 68 which extends along the entirety thereof from the first end 18 to the second end 20 on both sides of the shell 16 defined by the diameters described above. However, the scallops 38 on the linear portion 36 of the jagged portion 32 extend outwardly beyond a plane defined by the bottom 68, as shown in FIG. 3.

Locking means 70 in the form of an interlocking wall 72 and trough 74 are disposed about the bottom 68 of the shell 16. The wall 72 extends outwardly away from the bottom 68 in a tapered fashion a certain distance greater than that extended by the scallops 38. The configuration of the wall 72 matches a corresponding complementary configuration of the trough 74. In this manner, the wall 72 on one shell 16 can be inserted into the trough 74 on another shell 16 to form an interlocking engagement of the locking means 70.

The wall 72 extends away from the bottom 68 along the bottom 68 from a point 76 proximate the juncture between the first portion 26 and the second portion 42 to the latitudinal midline 25 of the shell 16. However, the wall 72 is not continuous along that path. A notch 78 is disposed on the wall 72 at a portion thereof disposed on the sloping portion 56. This notch 78 performs various functions, as will be described in detail herein.

The trough 74 extends from the bottom 68 towards the circuit pack mount 62. The trough 74 is recessed into the shell 16 to form a configuration which complements the configuration formed by the extension of the wall 72. The trough 74 extends from the latitudinal midline 25 of the shell 16 towards the second end 20. Unlike the wall 72, the trough 74 is continuous in its path from the latitudinal midline 25 to the second end 20. In this fashion, the trough 74 allows the housing 14 to expand and contract with heat, and also provides compensation for possibly mismatched or damaged shells 16.

The above-described construction of the wall 72 and the trough 74 is repeated along the opposite side of the bottom 68. However, the disposition of the wall 72 with respect to the trough 74 is reversed in order to assure that the housing 14 can be constructed non-handedly. Specifically, if a trough 74 is disposed on one side of the bottom 68, a wall 72 is disposed on the other side of the bottom 68, as shown in FIG. 8.

The circuit pack 12 is the subject matter of the copending patent application of Knollman et al., Ser. No. 07/469,646, and the circuitry thereof is disclosed in that application. However, it is to be noted that the circuit pack 12 can take on a plurality of different forms, such as those illustrated in FIG. 9 through FIG. 11, as will be discussed herein. For the purposes of this application, it is to be noted that the circuit pack 12 generally comprises, as shown in FIG. 4, a printed circuit board 66 having having a first electrical contact 80, a second electrical contact 82, and a third electrical contact 84 extending from the printed circuit board 66. The electrical contacts 80 through 84 are preferably wires, but they can take on a number of conductive forms. As stated above, the printed circuit board 66 has a peripheral configuration 64 which corresponds to a complementary configuration of the circuit pack mount 62.

The first electrical contact 80 extends away from the peripheral configuration 64 of the printed circuit board 66 along one edge thereof a certain distance sufficient for the first electrical contact 80 to traverse the distance between the circuit pack mount 62 and either the first or second ends 18 or 20, respectively, of the shell 16. Thus, the first electrical contact 80 is constructed to extend from the interior side 22 of the shell 16 to the exterior side 24 through one of the wire apertures 40 formed by the scallops 38, as will be discussed herein.

The second and third electrical contacts 82 and 84 extend away from the peripheral configuration 64 of the printed circuit board 66 along an edge thereof opposite to the edge along which the first electrical contact 80 extends. The second electrical contact 82 is constructed to project from the printed circuit board 66 through the notch 78 in the wall 72 on the bottom 68 of the shell 16. The second electrical contact 82 extends from the interior side 22 of the shell 16 to the exterior side 24 thereof through the notch 78. Once the second electrical contact 82 is on the exterior side 24, the contact 82 extends along and resides within a longitudinal reveal 86 formed by joining two shells 16, as will be discussed below.

The third electrical contact 84 extends away from the peripheral configuration 64 of the printed circuit board 66 along an end thereof opposite to the end from which the first electrical contact 80 extends. The third electrical contact 84, however, never leaves the confines of the interior 22 of the shell 16. The third electrical contact 84 terminates within the interior 22 of the shell 16 proximate to the first portion 26.

However, a light-emitting diode 88 is connected to the printed circuit board 66 proximate to the third electrical contact 84 by means of insulated electrical leads 89. The leads 89 are insulated to assure that no electrical contact will be made between the leads 89 and any other unintended electrical devices which may hamper the circuit pack 12. The leads 89 extend from the printed circuit board 66 from the interior 22 of the shell 16 to its exterior 24. The leads 89 exit the shell 16 by passing through the wire apertures 40 formed by the scallops 38. The diode 88 itself is thus disposed outside of the housing 14. But, it is to be noted that the circuit pack 12 functions equally well without the light-emitting diode 88. The light-emitting diode 88 is intended to provide a local indicator of the condition of the fuse.

The third electrical contact 84 is connected to an electrically conducting spring 90 by means of a splice 92 within the interior 22 of the shell 16. The spring 90 has a coiled portion 94 and a pig-tail end 96 disposed on both ends of the coiled portion 94. The pig-tail ends 96 on each end of the coiled portion 94 are identical in construction, thereby allowing the spring 90 to be connected to the splice 92 in a non-handed fashion, thereby leading to greater ease of assembly. The splice 92 forms an electrical and a mechanical joint between the third electrical contact 84 and the spring 90, and helps to avoid the application of undue torsional forces to the printed circuit board 66.

One pig-tail end 96 of the spring 90 extends from the splice 92 through the wire apertures 40 formed by the scallops 38 to the exterior 24 of the shell 16. The one pig-tail end 96 is connected to the coiled portion 94 proximate to the first portion 26 of the shell 16. Thus, the first portion 26 forms an insulated spring compression area 98 against which the coiled portion 94 may be compressed. The coiled portion 94 has an inner diameter 100 defining a space sufficient to accept the light-emitting diode 88. Preferably, a colored coating 102 is disposed on the pig-tail end 96 of the spring 90 to identify the electrical rating of the fuse.

The coiled portion 94 proximate to the colored portion 102 is constructed to be engaged by an alarm. Specifically, the third electrical contact 84 is intended to form an electrical connection between the fuse and a remote alarm device. Thus, when the fuse creates an open circuit, current will flow from the fuse to the remote alarm. The current reaches the alarm and energizes it, producing a remote indication of the condition of the fuse. Once the fuse has reset itself, the flow of current through the third electrical contact 84 is halted, and the issuance of the remote indication ceases.

As stated above, the fuse structure 10 is capable of encapsulating any of a plurality of fuse circuit packs 12. While it is desirable to maintain the peripheral configuration 64 of the printed circuit board 66, the fuse circuitry disposed thereon may be of different constructions.

Figure 10:
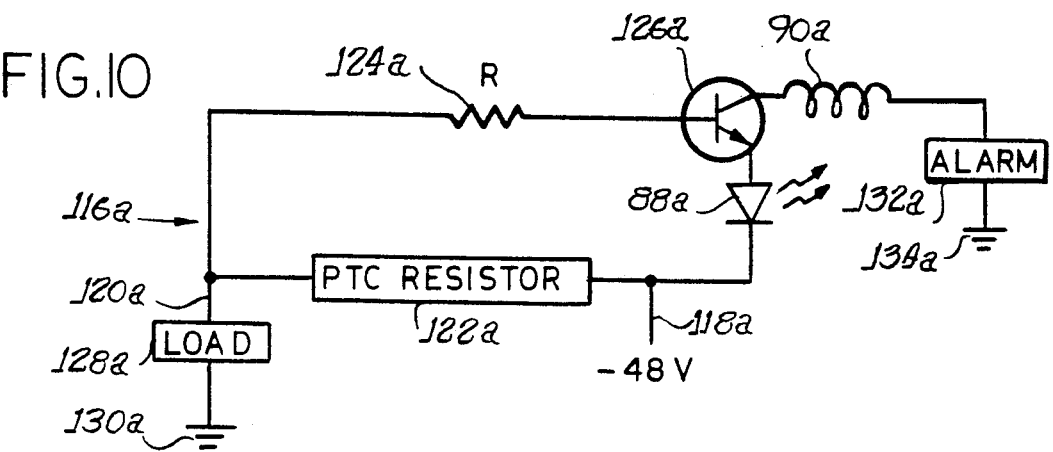
FIG. 10 is a schematic diagram of an alternative embodiment of the fuse circuit of FIG. 9.
Figure 11:
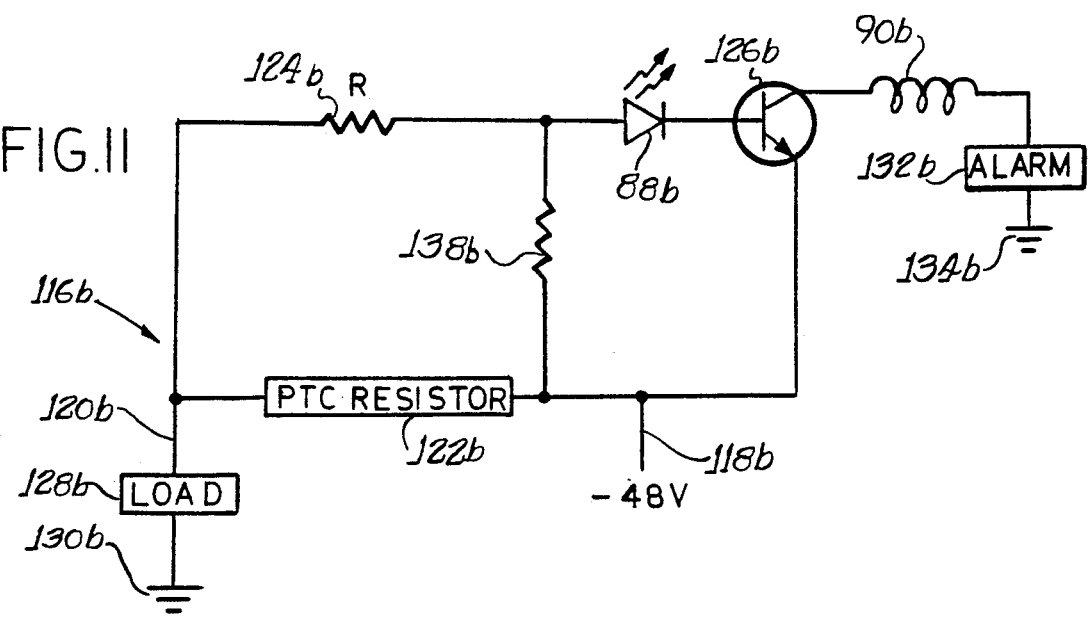
FIG. 11 is a schematic diagram of yet another alternative embodiment of the fuse circuit of FIG. 9.

One such fuse circuitry construction is disclosed in the co-pending patent application of Knollman et al., Ser. No. 07/469,646. Other circuitry constructions are shown in FIG. 9 through FIG. 11. These circuitry constructions are improvements over Knollman's circuit.

Specifically, the fuse circuit 116 schematically illustrated in FIG. 9 is an improved, equally functional alternative for inclusion on the printed circuit board 66. The circuit 116 comprises an input terminal 118, an output terminal 120, a PTC resistor element 122, a resistor 124, a light-emitting diode 88, and a transistor 126. It is to be noted that the light-emitting diode 88 need only be utilized if it is desired to have a local indication of the condition of the fuse.

The input terminal 118 is electrically located directly between one lead of the PTC resistor element 122 and the emitter of the transistor 126. The base of the transistor 126 is connected electrically in series first to the light-emitting diode 88, and then to the resistor 124. The light-emitting diode 88 and the resistor 124 are connected in series to the base. An end of the resistor 124 opposite to the end connected to the light-emitting diode 88 is connected to the output terminal 120, which is, in turn, connected electrically to a load 128. An end of the PTC resistor element 122 opposite to the end connected to the input terminal 118 is electrically connected between the resistor 124 and the output terminal 120. In turn, the load 128 is connected to a ground 130 to complete the circuit. The resistance of the resistor 124 is preferably approximately 24K Ohms, however, other suitable resistance values can be used.

The collector of the transistor 126 is electrically connected to the third electrical contact 84. Accordingly, the spring 90 becomes an electrical extension of the collector. In this manner, the collector is connected electrically to a remote alarm 132, which is energized to produce an indicator signal regarding the condition of the fuse. To complete the circuit, the alarm 132 is in turn connected to a ground 134.

FIG. 10 schematically illustrates another, equally functional fuse circuit 116a, in which elements corresponding to those in FIG. 9 are designated by the same reference numerals with the suffix "a" added. This embodiment employs a resistor 124a. The resistor 124a preferably has a resistance of approximately 24K Ohms, however, other suitable resistance values may be used. In this embodiment, the input terminal 118a is again electrically located between the emitter of the transistor 126a and the PTC resistor element 122a, however, the light-emitting diode 88a is electrically connected in series between the input terminal 118a and the emitter of the transistor 126a.

The base of the transistor 126a is connected to the resistor 124a, which is connected to the output terminal 120a at an end thereof opposite to the base. The end of the PTC resistor element 122a opposite to the end thereof connected to the input terminal 118a is connected electrically between the resistor 124a and the output terminal 120a. The output terminal 120a is, in turn, connected to the load 128a which is connected to the ground 130a to complete the circuit. The collector of the transistor 126a is connected to the alarm 132a in the same fashion as described above.

Yet another fuse circuit 116b is shown schematically in FIG. 11 in which elements corresponding to those described above are designated by the same reference numeral with the suffix "b" added. This embodiment utilizes a resistor 124b, having a resistance of approximately 10K Ohms, and a second resistor 138b. The second resistor 138b preferably has a resistance of approximately 1K Ohms, although other suitable resistance values can be used. Specifically, the input terminal 118b is again located electrically between the PTC resistor element 122b and the emitter of the transistor 126b. However, the input terminal 118b is also electrically connected to the second resistor 138b at the point at which the terminal 118b is connected to the PTC resistor element 122b.

The base of the transistor 126b is connected to the output terminal 120b through the light-emitting diode 88b and resistor 124b. The PTC resistor element 122b is connected to the output terminal 120b as before. The light-emitting diode 88b is connected in series with the resistor 124b. However, an end of the second resistor 138b opposite to the end thereof connected to the input terminal 118b is electrically connected between the light-emitting diode 88b and the resistor 124b. Thus, the emitter is connected to the base through the second resistor 138b and the light-emitting diode 88b.

The collector of the transistor 126b is connected to the alarm 132b, and the output terminal is connected to the load 128b in the same fashion as described above. While three different circuits are illustrated schematically, it is to be noted that each circuit 116, 116a, and 116b performs substantially the same function. Namely, if an over-current is present on the input terminal 118, it encounters the PTC resistor element 122 first.

The over-current raises the temperature of the PTC element 122, and as that temperature rises, the electrical resistance offered by the PTC element 122 increases substantially. Specifically, the resistance of the PTC element 122 increases sufficiently to prohibit current flow therethrough. The PTC element 122 essentially opens the circuit path to the load 128, thereby protecting it from the possibly harmful effects of the over-current.

Simultaneously, the transistor 126 is turned on. Current flows from the collector across the third electrical contact 84 to the alarm 132. The alarm 132 is thusly triggered into operation, providing an indication of the condition of the fuse circuit 116. If the light-emitting diode 88 is used, it is also energized, providing a corresponding local indication of the the condition of the fuse circuit 116.

The formation of the housing 14 and the fuse structure 10 will now be discussed. One begins by selecting two shells 16. As all of the shells 16 are identically constructed, any two will do. The circuit pack 12 is inserted into one of the shells 16 so that the peripheral configuration 64 thereon firmly engages the circuit pack mount 62.

At the same time, the electrical contacts 80 and 82, the leads 89, and the pig-tail end 96 of the spring 90 are placed within the scallops 38 and the notch 78 as described above. For greater clarity of discussion, the first electrical contact 80 will extend through the first end 18 of the shell 16, however, it is to be emphasized that all of the contacts can extend through either end of the shell 16 due to its mirrored construction as described above.

The first contact 80 is placed within one of the scallops 38 disposed proximate to the first end 18. The first contact 80 extends only slightly beyond the first end 18. The second contact 82 extends through the notch 78 in the wall 72 displaced furthest from the first end 18, and is encouraged to lie on the exterior 24 of the shell 16 against the wall 72 from the notch 78 towards the second end 20, as shown in FIG. 4.

The pig-tail end 96 of the spring 90 connected to the splice 92 is placed within one of the scallops 38 disposed proximate to the second end 20. Additionally, the leads 89 to the light-emitting diode 88 are also placed within scallops 38 disposed proximate to the second end 20. The diode 88 is located beyond the second end 20 outside of the shell 16 within the inner diameter 100 of the coiled portion 94 of the spring 90.

The other identical shell 16 is rotated one hundred and eighty degrees with respect to the shell 16 bearing the circuit pack 12. This rotation causes the identical constructions on each of the shells 16 to mate, allowing the walls 72 in one shell 16 to be inserted into the troughs 74 in the other shell 16 forming the locking means 70 shown in FIG. 1. The troughs 74 do not accept the entirety of the walls 72. Thus, the troughs 74 form positive stop means which properly locates the locking means 70.

When the shells 16 are properly mated, they form a longitudinal reveal 86 disposed on both sides of the housing 14, extending between the first and second ends 18 and 20. Also, as illustrated in FIG. 1, the walls 72 on opposite shells 16 form a vent opening 104 disposed through the walls 72 which communicate from the longitudinal reveal 86 to the interior 22 of the shells 16. The vent opening 104 forms circuit pack venting/cooling means by allowing air to circulate from one side of the housing 14, through one vent opening 104, around the circuit pack 12 thereby cooling it, and out of the housing 14 through the other vent opening 104.

The scallops 38 on both shells 16 confront one another forming wire apertures 40, shown clearly in FIG. 7, which accept the appropriate, above-disclosed elements. FIG. 7 shows a preferred embodiment of the housing 14 wherein the scallops 38 form three wire apertures 40. Also visible in FIG. 7 are the notches 78 in the walls 72 on either side of the housing 14. The wire apertures 40 and the notches 78 may not all be occupied by contacts or leads. For example, usually, proximate the first end 18, only one of the wire apertures 40 is occupied by the first electrical contact 80. This leaves two wire apertures 40 and both notches 78 unoccupied. Thus, the unoccupied wire apertures 40 and the notches 78 assist the vent opening 104 in venting and cooling the circuit pack 12 by contributing to the air flow through the housing 14.

To complete the fuse structure 10, a first ferrule 106 and a second ferrule 108, both composed of a conductive material, such as metal, are placed on the housing 14. The ferrules 106 and 108 can take on a number of different forms, depending upon the particular application of the fuse structure 10.

Generally, the first ferrule 106 is constructed to be located on the first end 18, thereby contacting the first electrical contact 80, while the second ferrule 108 is constructed to be located on the second end 20, thereby contacting the second electrical contact 82. The first ferrule 106 is substantially cylindrical in shape, having a opened end and a closed end. The second ferrule 108 is substantially ring-shaped, having two open ends.

The ferrules 106 and 108 are placed over their respective ends 18 and 20 of the housing 14. The placement of the ferrules 106 and 108 assures that the shells 16 are held firmly together. The ferrules 106 and 108 have inner diameters which are slightly larger than the diameters 44 and 52 of the second and fourth portions 42 and 50, respectively. This construction allows the ferrules 106 and 108 to be placed over the first through fourth portions.

However, the ferrules 106 and 108 have a reduced inner diameter configurations on one end thereof. These ends are intended to confront and to engage part of the second portions 42, and the reduced inner diameters are somewhat smaller than the diameter 44 of the second portion 42. Thus, the ends of the ferrules 106 and 108 cannot pass over the second portions 42. Accordingly, the second portions 42 and the reduced inner diameter ends of the ferrules 106 and 108 comprise a positive stop portion for locating the ferrules 106 and 108 properly.

When the first ferrule 106 is placed over the first end 18 of the completed housing 14, the ferrule 106 has a dimple 110 which accepts and exposes the first electrical contact 80. The dimple 110 is filled with an electrically conducting solder compound 117 which engages and electrically contacts the first electrical contact 80, as shown in FIG. 4. Thus, the first electrical contact 80 becomes integral electrically with the first ferrule 106.

When the second ferrule 108 is placed over the second end 20 of the completed housing 14, the ferrule 108 contacts and engages the second electrical contact 82, also illustrated in FIG. 4. In similar fashion, the second electrical contact 82 becomes electrically integral with the second ferrule 108. However, due to the ring-shaped configuration of the second ferrule 108, the first portion 26 extends beyond the ferrule 108. In this manner, the spring compression area 98 formed by the first portion 26 is separated a certain distance from the second ferrule 108 defined by the width of the first portion 26. Thus, the spring 90 and the third electrical contact 84 is electrically distinct from the first and second electrical contacts 80 and 82. This is an improvement over the indicator fuses of the prior art.

To strengthen the construction of the fuse structure 10, the ferrules 106 and 108 are deformed downwardly above the third portion 46 to form crimps 112 which engage the third portion 46 along the entirety of its diameter 48 on both shells 16. The crimps 112 increase the compression forces between the two shells 16, thereby increasing the structural integrity of the fuse structure 10. The crimps 112 also prevent the independent movement of the ferrules 106 and 108 with respect to the housing 14. Additionally, as the second ferrule 108 is crimped, the contact between the ferrule 108 and the second electrical contact 82 is improved and strengthened.

To further increase the structural integrity of the fuse structure 10, and to prevent the rotation of the ferrules 106 and 108 about the shells 16, portions of the ferrules are deformed to produce dents 114. The dents 114 extend from the exterior surface of the ferrules 106 and 108 and contact and engage the shells 16. Preferably, as shown in FIG. 1, the dents 114 are located somewhere along the second portion 42. The fuse structure 10 is now complete, and is ready for insertion into open air fuse contacts, or into a 18A fuse receptacle, well known in the art.

While a preferred embodiment of the present invention is shown and described, it is envisioned that those skilled in the art may devise various modifications of the present invention without departing from the spirit and scope of the appended claims. The invention is not intended to be limited by the foregoing disclosure, but only by the following appended claims.

The invention claimed is:

1. A fuse structure for automatically resetting fuses in the form of a housing, the housing comprising: a plurality of shells; locking means disposed on the shells; ferrules disposed on the housing; a plurality of ferrule mounts having a predetermined outside diameter disposed on the shells of the housing; annular indentations disposed on an outside surface of the ferrule mounts, said annular indentations having a diameter which is less than the outside diameter of the ferrule mounts; and a positive stop portion disposed on an inside surface of the ferrules, an inside diameter of each ferrule measured at the positive stop portion being less the outside diameter of the corresponding ferrule mount for positively locating the ferrules on the ferrule mounts and limiting movement of the ferrules relative to the ferrule mounts.

2. A fuse structure as defined in claim 1 wherein each shell has a construction with said locking means inversely mirrored about a latitudinal midline of the shell for cooperative mating engagement of the shells.

3. A fuse structure as defined in claim 1 wherein the shells are identically constructed.

4. A fuse structure as defined in claim 1 further comprising crimps disposed on the ferrules and projecting into the annular indentations in order to prevent movement of the ferrules independent of the housing.

5. A fuse structure as defined in claim 1 wherein the locking means comprises interlocking walls and troughs disposed on each shell so that the walls on one shell are interengagable with the troughs on another shell.

6. A fuse structure as defined in claim 5 further comprising positive stop means for properly locating the walls within the troughs.

7. A fuse structure as defined in claim 1 further comprising wire apertures disposed through the housing for allowing wires to extend from an interior of the housing to an exterior of the housing.

8. A fuse structure as defined in claim 1 further comprising a circuit pack mount disposed within the housing for mounting a fuse circuit pack within the housing.

9. A fuse structure as defined in claim 1 further comprising venting means disposed through the housing.

10. A fuse structure as defined in claim 1 further comprising a longitudinal reveal disposed on the housing on opposite sides thereof, and a vent opening disposed through the housing along the longitudinal reveal.

11. A fuse structure as defined in claim 1 further comprising, a fuse circuit pack disposed in said housing, an electrical contact extending from the housing in the form of a spring electrically connected to the fuse circuit pack, the spring having two pig-tail ends; an electrically insulated spring compression area contacting the spring, and against which the spring may be compressed disposed on the housing; a splice connects the spring to the fuse circuit pack both mechanically and electrically in such a fashion so as to avoid the application of undue torsional strain to the fuse circuit pack.

12. A fuse structure as defined in claim 1 further comprising dents disposed on the ferrules which depend from the ferrules and contact the ferrule mounts so as to prevent rotation of the ferrules independent of the ferrule mounts.

13. A fuse structure as defined in claim 1 further comprising a fuse circuit pack, said fuse circuit pack including an input terminal connected to one ferrule and an output terminal connected to another ferrule, a transistor, a PTC resistor element, and a resistor; an emitter of the transistor being electrically connected to one end of the PTC resistor element; the input terminal being electrically connected between the one end of the PTC resistor element and the emitter of the transistor; a base of the transistor being connected electrically to one end of the resistor; another end of the resistor being electrically connected to the output terminal; another end of the PTC resistor element being electrically connected between the another end of the resistor and the output terminal; a collector of the transistor being electrically connectable to an alarm; and a light-emitting diode electrically connected in series with the resistor between the base and the one end of the resistor.

14. A fuse structure as defined in claim 1 further comprising a fuse circuit pack, said circuit pack including an output terminal connected to one ferrule and an input terminal connected to another ferrule, a PTC resistor element, a first and a second resistor, and a transistor; an emitter of the transistor being electrically connected to one end of the PTC resistor element; the input terminal being electrically connected between the emitter and the one end of the PTC resistor element; a base of the transistor being electrically connected to one end of the first resistor; another end of the first resistor being electrically connected to the output terminal; another end of the PTC resistor element being electrically connected between the another end of the first resistor and the output terminal; the second resistor being electrically connected between the input terminal at one end thereof; another end of the second resistor being electrically connected between the base and the one end of the first resistor; and a collector of the transistor being electrically connectable to an alarm.

15. A fuse circuit comprising: an input and an output terminal, a transistor, a PTC resistor element, an alarm, and a resistor; an emitter of the transistor being electrically connected to one end of the PTC resistor element; the input terminal being electrically connected between the one end of the PTC resistor element and the emitter of the transistor; a base of the transistor being connected electrically to one end of the resistor; another end of the resistor being electrically connected to the output terminal; another end of the PTC resistor element being electrically connected between the another end of the resistor and the output terminal; a collector of the transistor being electrically connected to the alarm; and the alarm capable of issuing an indication of the condition of the fuse circuit; a light-emitting diode electrically connected in series with the resistor between the base and the one end of the resistor.

16. A fuse circuit as defined in claim 15 which includes a second resistor; the second resistor being electrically connected to the input terminal at one end thereof; and another end of the second resistor being electrically connected between the base and the one end of the first resistor.

17. A fuse structure for automatically resetting fuses in the form of a housing, the housing comprising: a plurality of shells; locking means disposed on the shells; the locking means including interlocking walls and troughs disposed on each shell so that the walls on one shell are interengageable with the troughs on another shell; ferrules disposed on the housing; a plurality of ferrule mounts disposed on the shells of the housing; annular indentations disposed on the ferrule mounts; and a positive stop portion disposed on the housing associated with each ferrule mount for positively locating the ferrules thereon.

18. A fuse structure as defined in claim 17 further comprising positive stop means for properly locating the walls within the troughs.

19. A fuse structure for automatically resetting fuses in the form of a housing, the housing comprising: a plurality of shells; locking means disposed on the shells; ferrules disposed on the housing; a plurality of ferrule mounts disposed on the shells of the housing; annular indentations disposed on the ferrule mounts; and a positive stop portion disposed on the housing associated with each ferrule mount for positively locating the ferrules thereon; a longitudinal reveal disposed on the housing on opposite sides thereof, and a vent opening disposed through the housing along the longitudinal reveal.

20. A fuse structure for automatically resetting fuses in the form of a housing, the housing comprising: a plurality of shells; locking means disposed on the shells; ferrules disposed on the housing; a plurality of ferrule mounts disposed on the shells of the housing; annular indentations disposed on the ferrule mounts; and a positive stop portion disposed on the housing associated with each ferrule mount for positively locating the ferrules thereon; a fuse circuit pack being disposed in said housing; an electrical contact extending from the housing in the form of a spring electrically connected to the fuse circuit pack, the spring having two pig-tail ends; an electrically insulated spring compression area contacting the spring, and against which the spring may be compressed disposed on the housing; a splice connects the spring to the fuse circuit pack both mechanically and electrically in such a fashion so as to avoid the application of undue torsional strain to the fuse circuit pack.

21. A fuse structure for automatically resetting fuses in the form of a housing, the housing comprising: a plurality of shells; locking means disposed on the shells; ferrules disposed on the housing; a plurality of ferrule mounts disposed on the shells of the housing; annular indentations disposed on the ferrule mounts; and a positive stop portion disposed on the housing associated with each ferrule mount for positively locating the ferrules thereon; dents disposed on the ferrules which depend from the ferrules and contact the ferrule mounts so as to prevent rotation of the ferrules independent of the ferrule mounts.

22. A fuse structure for automatically resetting fuses in the form of a housing, the housing comprising: a plurality of shells; locking means disposed on the shells; ferrules disposed on the housing; a plurality of ferrule mounts disposed on the shells of the housing; annular indentations disposed on the ferrule mounts; and a positive stop portion disposed on the housing associated with each ferrule mount for positively locating the ferrules thereon; a fuse circuit pack comprising an input terminal connected to one ferrule and an output terminal connected to another ferrule, a transistor, a PTC resistor element, and a resistor; an emitter of the transistor being electrically connected to one end of the PTC resistor element; the input terminal being electrically connected between the one end of the PTC resistor element and the emitter of the transistor; a base of the transistor being connected electrically to one end of the resistor; another end of the resistor being electrically connected to the output terminal; another end of the PTC resistor element being electrically connected between the another end of the resistor and the output terminal; a collector of the transistor being electrically connectable to an alarm; and a light-emitting diode electrically connected in series with the resistor between the base and the one end of the resistor.

* * * * *